United States Patent [19]

Simonsick et al.

[11] Patent Number: 5,231,120
[45] Date of Patent: Jul. 27, 1993

[54] CATHODIC ELECTRODEPOSITION COATINGS CONTAINING AN AMINO ESTER CROSSLINKING AGENT

[75] Inventors: William J. Simonsick; Edward Chu, both of Philadelphia, Pa.

[73] Assignee: E. I. Du Pont de Nemours and Company, Wilmington, Del.

[21] Appl. No.: 810,189

[22] Filed: Dec. 19, 1991

[51] Int. Cl.$^5$ .................... C08G 59/18; C08G 59/52; C09D 163/02; C09D 163/04

[52] U.S. Cl. .................... 523/403; 523/404; 525/526

[58] Field of Search ............. 523/404, 403; 525/526

[56] References Cited

U.S. PATENT DOCUMENTS

| | | | |
|---|---|---|---|
| 3,455,735 | 7/1969 | Shwarz | 117/138.8 |
| 3,585,172 | 6/1971 | Nishiyama et al. | 260/78.5 |
| 3,766,118 | 10/1973 | Albers et al. | 260/29.2 |
| 3,766,119 | 10/1973 | Snapp et al. | 260/29.2 |
| 3,795,701 | 3/1974 | Jenkins et al. | 260/484 |
| 3,922,253 | 11/1975 | Jerabek et al. | 260/77.5 |
| 4,076,917 | 2/1978 | Swift et al. | 526/49 |
| 4,088,554 | 5/1978 | Felder et al. | 204/159.15 |
| 4,096,105 | 6/1978 | McGinniss | 260/29.6 |
| 4,101,606 | 7/1978 | Cenci et al. | 260/857 |
| 4,115,637 | 9/1978 | Cenci et al. | 526/56 |
| 4,126,595 | 11/1978 | Martorano et al. | 260/29.4 |
| 4,137,140 | 1/1979 | Belanger | 204/181 |
| 4,138,541 | 2/1979 | Cenci et al. | 526/303 |
| 4,147,679 | 4/1979 | Scriven et al. | 260/29.2 |
| 4,190,693 | 2/1980 | Marterano et al. | 428/209 |
| 4,346,144 | 8/1982 | Craven | 428/335 |
| 4,364,860 | 12/1982 | Patzschke et al. | 525/127 |
| 4,373,059 | 2/1983 | Patzschke et al. | 524/761 |
| 4,373,072 | 2/1983 | Patzschke et al. | 525/438 |
| 4,419,467 | 12/1983 | Wismer et al. | 523/414 |
| 4,454,301 | 6/1984 | Cady et al. | 525/118 |
| 4,459,393 | 7/1984 | Barnhoorn et al. | 525/530 |
| 4,468,307 | 8/1984 | Wismer et al. | 204/181 |
| 4,477,530 | 10/1984 | Diefenbach et al. | 428/413 |
| 4,482,474 | 11/1984 | Biedermann et al. | 252/311 |
| 4,491,611 | 1/1985 | Barnhoorn et al. | 427/386 |
| 4,495,335 | 1/1985 | Geist et al. | 525/438 |
| 4,505,981 | 3/1985 | Geist et al. | 428/418 |
| 4,547,409 | 10/1985 | Geist et al. | 427/386 |
| 4,595,717 | 6/1986 | Patzschke et al. | 523/414 |
| 4,600,485 | 7/1986 | Patzschke et al. | 204/181.7 |
| 4,644,036 | 2/1987 | Walz et al. | 525/386 |
| 4,684,710 | 8/1987 | Schimmel et al. | 528/26 |
| 4,686,249 | 8/1987 | Diefenbach et al. | 523/410 |
| 4,769,400 | 9/1988 | Geist | 525/526 |
| 4,983,266 | 1/1991 | Gupta | 523/412 |

*Primary Examiner*—John C. Bleutge
*Assistant Examiner*—D. R. Wilson
*Attorney, Agent, or Firm*—Hilmar L. Fricke

[57] ABSTRACT

An improved aqueous electrocoating composition having a binder of an epoxy-amine adduct; wherein the improvement is the use of a $\beta$ amino ester crosslinking agent having the following formula

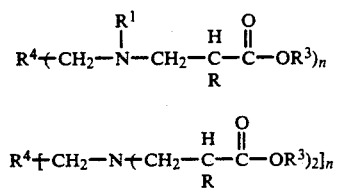

wherein:
n is an integer of 2–10,
R is H or CH$_3$,
R$^1$ is R$^2$—OH or an alkyl group 1–4 carbon atoms,
R$^2$ is an alkylene group having 1–4 carbon atoms
R$^3$ is an alkyl group having 1–12 carbon atoms and
R$^4$ is a polymeric component having a weight average molecular weight of about 200–10,000.

6 Claims, No Drawings

CATHODIC ELECTRODEPOSITION COATINGS CONTAINING AN AMINO ESTER CROSSLINKING AGENT

BACKGROUND OF THE INVENTION

This invention is directed to a cathodic electrocoating composition and in particular to a cathodic electrocoating composition that does not contain a conventional blocked isocyanate crosslinking agent but contains an amino ester crosslinking agent which cures the composition after it has been electrodeposited and provides a finish that is resistant to attack by solvents within a short time after the finish is baked.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a coating having the desired thickness is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

It would be desirable to use a crosslinking agent that does not contain an isocyanate but provides a cured film or coating that is equivalent in properties such as solvent resistance and chip resistance to those cured with an isocyanate crosslinking agent under similar curing conditions.

SUMMARY OF THE INVENTION

An improved aqueous electrocoating composition having a binder of an epoxy-amine adduct; wherein the improvement is the use of a amino ester crosslinking agent having the following formula

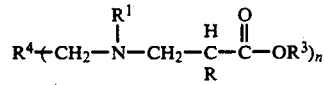

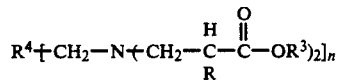

wherein:
n is an integer of 2–10,
R is H or $CH_3$,
$R^1$ is $R^2$—OH or an alkyl group 1–4 carbon atoms,
$R^2$ is an alkylene group having 1–4 carbon atoms,
$R^3$ is an alkyl group having 1–12 carbon atoms and
$R^4$ is a polymeric component having a weight average molecular weight of about 200–10,000.

DETAILED DESCRIPTION OF THE INVENTION

The $\beta$ amino ester crosslinking agent is used in cathodic electrocoating compositions in place of the conventionally used blocked isocyanate crosslinking agent to cure the epoxy-amine adduct after electrodeposition under conventional curing conditions. The resulting film has good solvent resistance which indicates that it has been adequately cured.

The crosslinking agent is formed by reacting a primary amine or ammonia with an alpha-beta ethylenically unsaturated carboxylic acid ester and then reacting the resulting intermediate with a polymeric compound such as an epoxy resin. The intermediate is formed at a temperature of about −10°–90° C. for about 0.5–5 hours. The hydrogen from the amine or ammonia reacts with the double bond of the acid ester via a Micheal Addition Reaction. With a primary amine an intermediate of the following formula is formed

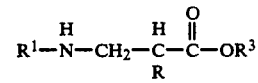

where R, $R^1$ and $R^3$ are defined above.

The intermediate when prepared with ammonia has the following formula

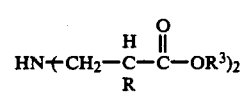

where R and $R^3$ are defined above.

The intermediate is reacted with a polymeric compound such as an epoxy resin at a temperature of about 40°–120° C. for about 0.5–3 hours to form the crosslinking agent. The reactive hydrogen of the nitrogen of the intermediate reacts with the polymeric compound. It is important that the nitrogen atom in the crosslinking agent is attached to the $\beta$ carbon atom of the ester to provide a crosslinking agent with the desired reactivity.

Typically useful alpha-beta ethylenically unsaturated carboxylic acid esters that can be used to form the crosslinking agent are alkyl acrylates and methacrylates having 1-12 carbon atoms in the alkyl group such as methyl acrylate, ethyl acrylate, propyl acrylate, butyl acrylate, pentyl acrylate hexyl acrylate, 2-ethyl hexyl acrylate, nonyl acrylate, lauryl acrylate and the like, methyl methacrylate, ethyl methacrylate, propyl methacrylate, butyl methacrylate, pentyl methacrylate, hexyl methacrylate, 2-ethyl hexyl methacrylate, nonyl methacrylate, lauryl methacrylate and the like. Alkyl acrylates are preferred because of their faster reactivity.

Typically useful amines are primary amines such as alkanol amines like ethanolamine, methanol amine, propanol amine and the like, alkyl amines such as methyl amine, ethyl amine, propyl amine, isopropyl amine, butyl amine and the like. Aromatic and cycloaliphatic primary amine also can be used.

Typically useful polymeric compounds that can be used are epoxy hydroxy polyether resins such as those formed from epichlorohydrin and bis phenol A. Other useful resins are epoxy novalac resins which are phenol formaldehyde resins that are epoxylated.

In one particularly preferred β amino ester crosslinking agent made via a primary amine $R^4$ is the residual of an epoxylated phenol formaldehyde resin, R is H, $R^1$ is $R^2$—OH where $R^2$ is an alkyl group having 1-4 carbon atoms, $R^3$ is an alkyl group having 4-8 carbon atoms and n is 4-8. In another praticularly preferred β amino ester crosslinking agent made via ammonia $R^4$ is the residual of an epoxy resin, R is H, $R^3$ is an alkyl group having 1-4 carbon atoms and n is 4-8.

The crosslinking agent can incorporated into the electrocoating composition at most any stage of the manufacture of the composition. It can be added, for example to the formulated composition, to the pigment dispersion, to the aqueous emulsion of an epoxy amine adduct.

The β amino ester crosslinking agent reacts with the epoxy amine adduct of the electrocoating composition via a transamidation reaction. A catalyst needs to be incorporated in the electrocoating composition to catalyze this reaction. About 0.5-5% by weight, based on the weight of the binder of catalyst is used. Typically useful catalysts are metal esters such as metal octoates such as lead octoate, cobalt octoate, stannous octoate and the like. Metal chelates such as cobalt acetyl acetonate, iron acetyl acetonate, zinc acetyl acetonate and the like also can be used.

Most principal emulsions used in an electrocoating composition comprise an aqueous emulsion of an epoxy amine adduct which has been neutralized with an acid to form a water soluble product. The preferred resin is the typical epoxy-amine adduct of the prior art. These resins are generally disclosed in U.S. Pat. No. 4,419,467 which is incorporated herein by reference.

The cathodic binder resin of the epoxy amine adduct and the crosslinking agent are the principal resinous ingredients in the electrocoating composition and are usually present in amounts of about 5-60% by weight of solids and preferably 30-40% by weight. To form an electrocoating bath which is an aqueous dispersion, the solids are reduced with an aqueous medium.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used. After grinding, the particle size of the pigment should be as small as practical, generally, the particle size is about 6-8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have also been found to adversely affect coalescence and flow.

The coating compositions of the invention can contain optional ingredients such as wetting agents, surfactants, wetting agents defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1-20% by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3-50% preferably 5-40% by weight binder solids. Aqueous binder concentrates which are to be further diluted with water when added to an electrocoating bath, generally have a range of binder solids of 10-30% by weight.

Besides water, the aqueous medium generally contains a coalescing solvent or solvents. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol and phenyl ether of propylene glycol. The amount of coalescing solvent is not unduly critical and is generally between about 0.1-15% by weight, preferably about 0.5-5% by weight based on total weight of the resin solids.

The following example illustrates the invention. All parts and percentages are on a weight basis unless otherwise indicated.

EXAMPLE

Preparation of β Amino Ester Crosslinking Agent

The following ingredients were charged into a suitably equipped reaction vessel:

|  | Equivalents | Parts By Weight |
|---|---|---|
| Portion 1 | | |
| Ethanolamine | 1.0 | 61.0 |
| 4-Methoxyphenol | | 0.3 |
| Ethylene glycol monobutyl ether | | 126.0 |
| Portion 2 | | |
| 2-Ethylhexyl acrylate monomer (2-EHA) | 1.0 | 184.0 |
| 4-Methoxyphenol | | 0.3 |
| Portion 3 | | |
| D.E.N. 438 MK75 (Epoxy novolac resin solution - 75% solids in methyl butyl ketone having an epoxy equivalent weight of 170-180) | 1.0 | 231.0 |
| Total | | 602.60 |

Portion 1 was charged into a reaction vessel under a blanket of nitrogen. The mixture was cooled to 20° C. using an ice water bath. Portion 2 was mixed and charged into the reaction vessel over a 1 hour period while holding the reaction mixture at about 20° C. until the percent double bond was less than 0.2%. The decrease in double bond content is due to the Micheal Addition Reaction of the amine hydrogens of ethanolamine across the double bond of the 2-EHA. Subsequently, Portion 3 was added and the temperature of the reaction mixture rose slowly and was held at 70° C. until the milli-equivalent of epoxy per gram of solution was ≦0.1. The solution was cooled to 50° C.

Preparation of Primary Amine Containing Backbone Resin

A diketimine was first prepared and then the resin was prepared.

Preparation of Diketimine

The following constituents were charged into a suitably equipped reaction vessel:

|  | Parts by Weight |
|---|---|
| Diethylene triamine | 412.7 |
| Methyl isobutyl ketone (MIBK) | 1400.0 |
| Total | 1812.7 |

The resulting mixture was heated to its reflux temperature of about 110° C. under a nitrogen blanket. 144 parts by weight of water which is the by-product of the reaction was azeotropically removed. Then 180 parts by weight of MIBK was stripped off and the mixture was cooled to 50° C. The diketimine has an amine equivalent weight of about 123.7 at 72% solids with an amine functionality of 3.

Preparation of Primary Amine Containing Resin

The following constituents were charged into a suitably equipped reaction vessel:

|  | Equivalents | Parts By Weight |
|---|---|---|
| Portion 1 | | |
| "Synfac 8105" (Polyether epoxy resin of bisphenol A, propylene oxide and epichlorohydrin having an epoxy equivalent weight of 325 from Milliken Chemical Co.) | 0.92 | 299.8 |
| Bisphenol A | 2.32 | 264.2 |
| MIBK | | 11.4 |
| Diethanolamine | 0.05 | 5.6 |
| Portion 2 | | |
| "DER-361" (Epoxy resin of bisphenol A epichlorohydrin having an epoxy equivalent weight of 195) | 2.67 | 520.7 |
| Diethanolamine | 0.05 | 5.2 |
| Portion 3 | | |
| Ethylene glycol monohexyl ether | | 34.6 |
| Ethylene glycol monobutyl ether | | 39.5 |
| MIBK | | 200.7 |
| Portion 4 | | |
| Diketimine Solution (prepared above) | 1.08 | 401.0 |
| Portion 5 | | |
| Deionized water | | 40.0 |
| MIBK | | 411.0 |
| Total | | 2233.7 |

Portion 1 was charged into the reaction vessel and heated under an atmosphere of nitrogen to 130° C. After an exothermic reaction the reaction mixture was held at 150° C. until the milli-equivalent of combined amine and epoxy per gram of solution was =0.2 (about 2 hours). The reaction mixture was cooled to 120° C. and Portion 2 was added and held at 120° C. until the milli-equivalent of the combined amine epoxy per gram of solution was about 1.21-1.17 (about 1.5 hours). Portion 3 was added an the reaction mixture was cooled to 70° C. and held at this temperature for one hour. The temperature of the reaction mixture was increased to 120° C. and held for 2 hours and cooled to 90° C. Portion 5 was added and the mixture was cooled to 50° C.

Preparation of Hydroxyl Functional Resin

The following constituents were charged into a suitably equipped reaction vessel:

|  | Equivalents | Parts by Weight |
|---|---|---|
| Portion 1 | | |
| "Synfac 8105" (described above) | 0.93 | 303.24 |
| Bisphenol A | 2.34 | 267.18 |
| Methyl ethyl ketone (MEK) | | 11.52 |
| Portion 2 | | |
| "DER-361" (described above) | 2.70 | 526.63 |
| Diethanolamine | 0.05 | 5.70 |
| Portion 3 | | |
| Ethylene glycol monobutyl ether | | 54.82 |
| MEK | | 233.64 |
| Portion 4 | | |
| Diethanolamine | 0.35 | 36.39 |
| Methylethanol amine | 0.74 | 55.60 |
| Total | | 1500.00 |

Portion 1 was charged into the reaction vessel under an atmosphere of nitrogen and heated to 130° C. After an exothermic reaction the mixture was held at 150° C. until the milli-equivalent of combined amine and epoxy per gram solution was =0.2 (about 2 hours). The reaction mixture was cooled to 120° C. and Portion 2 was added and held at 120° C. until the milli-equivalent of the combined amine and epoxy per gram solution was about 1.21-1.12 (about 1.5 hours). Portion 3 was added and the reaction mixture cooled to 70° C. Portion 4 was added and the reaction mixture was held at 70° C. for one hour. The reaction mixture was heated to 120° C. and held at his temperature until the milli-equivalent of epoxy per gram solution = 0.05 (about 1 hour). The mixture was cooled to 50° C.

Coating compositions A, B and C were formulated by thoroughly blending together the constituents as set forth in Table 1.

TABLE 1

Formulation of Coating Compositions A, B and C with the β Amino Ester Crosslinking Agent and Primary Amine or Hydroxyl Functional Backbone Resins

| Coating Composition | PARTS BY WEIGHT | | |
|---|---|---|---|
| | A | B | C |
| β Amino Ester Crosslinking Agent (prepared above) | 11.6 | 11.6 | 11.6 |
| Primary amine containing resin (prepared above) | 29.2 | 29.2 | — |
| Hydroxyl functional resin (prepared above)) | — | — | 21.9 |
| MEK | 9.3 | 9.3 | 16.6 |
| Lead octoate (24% Lead) | — | 2.0 | 2.0 |
| Total | 50.1 | 52.1 | 52.1 |

Coating compositions A–C were each drawn on a separate zinc phosphate coated steel panel. Two panels were coated with each coating composition. One set of panels was baked at 163° C. for 30 minutes and the second set at 177° C. for 30 minutes. The solvent resistance of each of the panels was tested by double rubbing each panel with an MEK soaked cloth. The number of rubs for each of the coating compositions A–C is shown in Table 2.

TABLE 2

Solvent Resistance of Various Coating Baked at Various Temperatures for 30 minutes

| Formulation | No. of MEK Double Rubs at Two Bake Temperatures | |
|---|---|---|
| | 163° C. | 177° C. |
| A | 36 | 39 |
| B | >100 | >100 |
| C | 16 | 16 |

Coating composition B which contained a primary amine containing resin and the β amino ester crosslinking agent and lead octoate catalyst was fully cured via a transamidation reaction. Curing was exhibited by the solvent resistance test which showed resistance to over 100 MEK double rubs. Coating composition A which was identical to coating composition B except for the lead octoate catalyst did not cure and illustrates the need for a catalyst to achieve the transamidation reaction and good cure. Coating composition C did not contain a primary amine containing resin but a hydroxyl functional resin which cures via a transesterification reaction. Curing of the coating was not achieved as shown by the MEK solvent resistance test which is unexpected.

A cathodic electrocoating composition was formulated by throughly blending together the following constituents:

| | Parts by Weight |
|---|---|
| β Aminoester Crosslinking Agent (prepared above) | 104 |
| Primary Amine containing Resin (prepared above) | 208 |
| Lead Ocotate (24% Lead) | 12 |
| Formic Acid Solution (90% Acid) | 7 |
| Deionized Water | 676 |
| Total | 1007 |

The β amino ester crosslinking agent, primary amine containing resin, lead octoate and formic acid were premixed in a container equipped with an agitator for 30 minutes. Deionized water was slowly added with good agitation until the mixture was inverted or emulsified to an aqueous dispersion. The resulting cathodic dispersion was agitated in an open mixing vessel overnight. Cold roll steel and zinc phosphated metal panels were cathodically electrocoated at 200 volts for 2 minutes and the electrocoated panels were baked in an oven at 163° C. for 30 minutes. The film on each panel had a thickness of about 15 microns and exhibited a good cure. Each panel passed 50 MEK double rubs.

We claim:

1. In a cathodic electrocoating composition, comprising an aqueous carrier having dispersed therein a film forming binder comprising an epoxy-amine adduct; wherein the improvement comprises the use of about 5–60% by weight, based on the weight of the film forming binder of the composition, of a β amino ester crosslinking agent having the following formula:

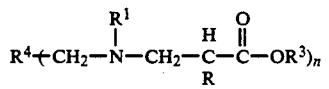

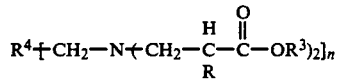

wherein:
n is an integer of 2–10,
R is H or CH$_3$,
R$^1$ is R$^2$—OH or an alkyl group having 1–4 carbon atoms,
R$^2$ is an alkylene group having 1–4 carbon atoms,
R$^3$ is an alkyl group having 1–12 carbon atoms, and
R 4 is the residual of an epoxy resin having a weight average molecular weight of about 200–10,000.

2. The cathodic electrocoating composition of claim 1 wherein R$^4$ is the residual of an epoxy hydroxy polyether resin.

3. The cathodic electrocoating composition of claim 1 wherein R$^4$ is the residual of an epoxylated phenol formaldehyde resin.

4. The cathodic electrocoating composition of claim 3 wherein the amino ester crosslinking agent has the following formula

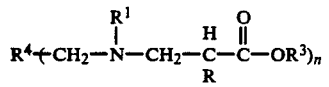

where R is H, R$^1$ is R$^2$—OH, R$^3$ is an alkyl group having 4–8 carbon atoms and n is 4–8.

5. The cathodic electrocoating composition of claim 1 wherein the aminoester crosslinking agent has the following formula

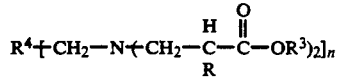

where R is H, R$^3$ is an alkyl group having 4–8 carbon atoms and n is 4–8.

6. The coating composition of claim 1 containing about 0.5–5% by weight, based on the weight of the binder, of a transamidation catalyst.

* * * * *